(12) United States Patent
Varnhagen et al.

(10) Patent No.: US 12,545,297 B2
(45) Date of Patent: Feb. 10, 2026

(54) METHODS AND SYSTEMS FOR GENERATING A LONGITUDINAL PLAN FOR AN AUTONOMOUS VEHICLE BASED ON BEHAVIOR OF UNCERTAIN ROAD USERS

(71) Applicant: FORD GLOBAL TECHNOLOGIES, LLC, Dearborn, MI (US)

(72) Inventors: Scott Julian Varnhagen, Ann Arbor, MI (US); Alice Kassar, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1063 days.

(21) Appl. No.: 17/143,509

(22) Filed: Jan. 7, 2021

(65) Prior Publication Data

US 2022/0212694 A1    Jul. 7, 2022

(51) Int. Cl.
*B60W 60/00* (2020.01)
*B60W 30/08* (2012.01)
*G06V 20/58* (2022.01)

(52) U.S. Cl.
CPC ........ *B60W 60/0018* (2020.02); *B60W 30/08* (2013.01); *G06V 20/58* (2022.01); *B60W 2510/18* (2013.01); *B60W 2554/4042* (2020.02); *B60W 2554/4049* (2020.02)

(58) Field of Classification Search
CPC .. B60W 60/00; B60W 30/00; B60W 2510/00; B60W 2540/00; B60W 2554/00; G06V 20/00
See application file for complete search history.

(56) References Cited

U.S. PATENT DOCUMENTS

| | | | |
|---|---|---|---|
| 9,656,667 | B2 | 5/2017 | Agnew et al. |
| 10,156,850 | B1 | 12/2018 | Ansari et al. |
| 10,248,129 | B2 | 4/2019 | Reed |
| 2018/0164822 | A1 | 6/2018 | Chu et al. |
| 2019/0243371 | A1* | 8/2019 | Nister ................ G05D 1/0242 |
| 2019/0291728 | A1* | 9/2019 | Shalev-Shwartz ........ B60T 7/18 |
| 2020/0064851 | A1 | 2/2020 | Wilkinson |
| 2020/0139967 | A1* | 5/2020 | Beller ................ G05D 1/0223 |
| 2021/0031760 | A1* | 2/2021 | Ostafew ............ B60W 60/0017 |
| 2021/0114617 | A1* | 4/2021 | Phillips ............ B60W 30/0956 |
| 2021/0200212 | A1* | 7/2021 | Urtasun ............ B60W 60/0011 |
| 2022/0227367 | A1* | 7/2022 | Kario ................ B60W 30/0956 |
| 2022/0379917 | A1* | 12/2022 | Henke ................ B60W 60/0011 |

FOREIGN PATENT DOCUMENTS

CN    110654377 A    1/2020

\* cited by examiner

*Primary Examiner* — Aniss Chad
*Assistant Examiner* — Elizabeth J Slowik
(74) *Attorney, Agent, or Firm* — Frank A. MacKenzie; Brooks Kushman, P.C.

(57) ABSTRACT

A system includes a computing device of an autonomous vehicle and a computer-readable storage medium that includes one or more programming instructions. The system identifies one or more lead objects located in front of the autonomous vehicle, and, for each of the one or more lead objects that are identified, determines an action type associated with the lead object which is used to generate a longitudinal plan for the autonomous vehicle.

23 Claims, 9 Drawing Sheets

METHODS AND SYSTEMS FOR GENERATING A LONGITUDINAL PLAN FOR AN AUTONOMOUS VEHICLE BASED ON BEHAVIOR OF UNCERTAIN ROAD USERS

BACKGROUND

To operate safely and comfortably on roadways, an autonomous vehicle must slow and/or stop for various objects and/or actors including, without limitation, other vehicles, road users (e.g., bicyclists or pedestrians), or static objects (e.g., road debris or construction pylons). All of these actors and/or objects require potential longitudinal action from the autonomous vehicle.

The decision of whether to take or not take an action on such actors or objects may not be known with certainty due to various noise factors. Perception noise, occluded views and the general challenge of forecasting the behavior of other road issues may make it difficult for an autonomous vehicle to decide whether to take action with respect to various actors and/or objects. For example, an autonomous vehicle may be uncertain about whether action should be taken or not with respect to a road user who is exhibiting unpredictable behavior.

If an autonomous vehicle takes certain action on a non-existent or non-interacting object or actor, this behavior may present an uncomfortable riding experience to passengers. However, if an autonomous vehicle does not take action on an actor or object, the autonomous vehicle may move closer to such actor or object than is desired in certain situations.

This document describes methods and systems that are directed to addressing the problems described above, and/or other issues.

SUMMARY

In various embodiments, a system includes a computing device of an autonomous vehicle and a computer-readable storage medium that includes one or more programming instructions that, when executed, cause the computing device to perform various actions. The system identifies one or more lead objects located in front of the autonomous vehicle, and, for each of the one or more lead objects that are identified, determines an action type associated with the lead object. The action type indicates a type of action for the autonomous vehicle to take with respect to the lead object, and includes a direct action type and an indirect action type. The system generates one or more constraints associated with the lead object for each of the one or more lead objects associated with the direct action type, generates one or more processing operations associated with the lead object for each of the one or more lead objects associated with the indirect action type, generates a constraint set comprising at least a portion of the constraints generated for each of the one or more lead objects associated with the direct action type, generates a processing operation set comprising at least a portion of the processing operations generated for each of the one or more lead objects associated with the indirect action type, and generates a longitudinal plan for the autonomous vehicle based in part on the constraint set and the processing operation set.

The system may cause the autonomous vehicle to adjust its operation based on the longitudinal plan. Optionally, the system may cause the autonomous vehicle to limit its positive acceleration, or decelerate.

The system may determine an action type associated with the lead object by identifying a stopping authority of the autonomous vehicle, and determining whether the autonomous vehicle would interact with the lead object if the autonomous vehicle exercised the stopping authority. The stopping authority may include one or more of the following: a maximum rate of deceleration or a maximum rate-of-change of acceleration.

The system may determine whether the autonomous vehicle would interact with the lead object if the autonomous vehicle exercised the stopping authority by identifying a safety margin associated with the lead object, propagating one or more states of the autonomous vehicle over a time period to a complete stop, for each propagated state, determine whether a distance between the autonomous vehicle in the propagated state at a time in the time period and a predicted position of the lead object at the time is less than the safety margin, and in response to determining that the distance between the autonomous vehicle in the propagated state at the time and a predicted position of the lead object at the time is less than the safety margin, assigning the lead object the direct action type. The safety margin may represent a distance away from the lead object.

The system may determine an action type associated with the lead object by determining a certainty level associated with the lead object, determining a severity of action associated with the lead object, determining an object type associated with the lead object, identifying a rate of deceleration and a rate of jerk associated with the certainty level, the severity of action, and the object type, and determining whether an interaction with the lead object can be avoided if the autonomous vehicle exercises the rate of deceleration and the rate of jerk.

The system may determine whether an interaction with the lead object can be avoided if the autonomous vehicle exercises the rate of deceleration and the rate of jerk by identifying a safety margin associated with the lead object, propagating one or more states of the autonomous vehicle over a time period to a complete stop, and for each propagated state, determining whether a distance between the autonomous vehicle in the propagated state at a time in the time period and a predicted position of the lead object at the time is less than the safety margin. The safety margin may represent a distance away from the lead object.

The system may, in response to determining that the distance between the autonomous vehicle in the propagated state at the time and a predicted position of the lead object at the time is less than the safety margin, assign the lead object the direct action type.

The system may, in response to determining that the distance between the autonomous vehicle in the propagated state at the time and a predicted position of the lead object at the time is not less than the safety margin, assign the lead object the indirect action type.

The system may generate a constraint set by combining the at least a portion of the constraints generated for each of the one or more lead objects associated with the direct action type.

The system may generate a processing operation set by combining the at least a portion of the processing operations generated for each of the one or more lead objects associated with the indirect action type.

The system may generate a longitudinal plan for the autonomous vehicle by providing a most restrictive constraint from the constraint set and a most restrictive processing operation from the processing operation set to a longitudinal controller of the autonomous vehicle.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

This document describes systems and methods for autonomous vehicles to use to decide whether to take action or take no action on one or more lead objects, as described in more detail below. For purposes of this disclosure, taking action refers to adjusting a longitudinal action of an autonomous vehicle. This may include, without limitation, limiting positive acceleration of an autonomous vehicle or decelerating by the autonomous vehicle.

The decision whether to take action or not take action on a lead object may be based, at least in part, on a certainty level that the autonomous vehicle has with respect to the behavior of the lead object. This decision may be incorporated into a longitudinal plan for the autonomous vehicle.

Figure 1:
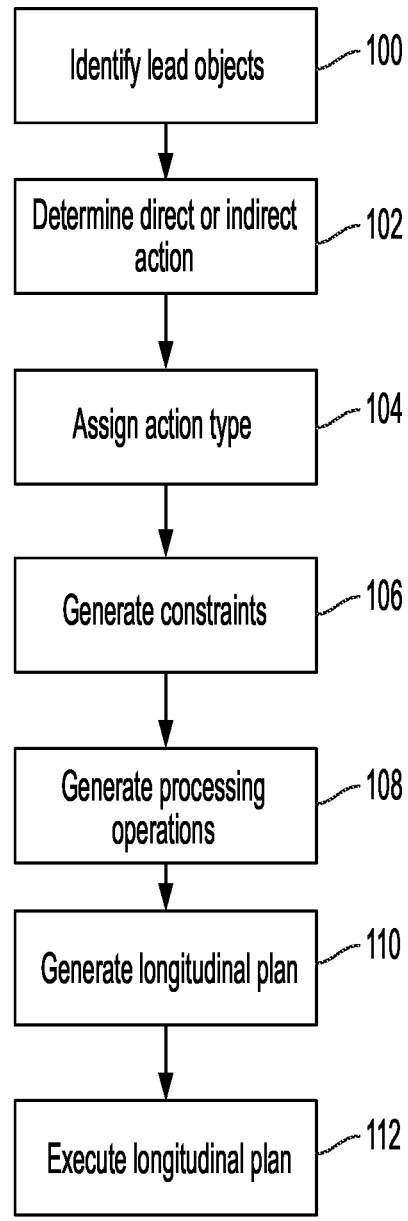
FIG. 1 illustrates a flow chart of an example method of generating a longitudinal plan for an autonomous vehicle.

FIG. 1 illustrates a flow chart of an example method of generating a longitudinal plan for an autonomous vehicle. As illustrated by FIG. 1, an on-board computing device of an autonomous vehicle may identify 100 one or more lead objects. A lead object refers to an object or actor located in front of the autonomous vehicle. In various embodiments, a lead object may be an object or actor that may merit an autonomous vehicle taking action to avoid an interaction between the autonomous vehicle and such object or actor. Examples of lead objects may include, without limitation, other vehicles, bicyclists, pedestrians, static objects (such as road debris, construction pylons, etc.) and/or the like.

As discussed in more detail below, an on-board computing device may identify 100 one or more lead objects as part of perception information of the surrounding environment of the autonomous vehicle. For example, an on-board computing device may determine perception data, including, without limitation, information pertaining to one or more lead objects, based on sensor data provided by one or more sensors of the autonomous vehicle.

The on-board computing device may obtain information pertaining to one or more of the identified lead objects. This information may include, a type associated with the lead object, a current state of the lead object, a future state of the lead object, and/or an indication of a level of certainty that action should be taken on the lead object by the autonomous vehicle (referred to through this disclosure as the certainty level).

In various embodiments, the type associated with the lead object may be an indicator of the type of actor or object of the lead object. For example, a lead object may have a type of vehicle, pedestrian, static object, and/or the like.

In various embodiments, the system may receive raw data logs collected (e.g., recorded, obtained, measured, etc.) by sensors mounted on a vehicle during operation (e.g., driving). Examples of such raw data logs may include, without limitations, point clouds, 2D images, 3D images, audio logs, or the like. Data logs can include single data points (e.g., single images, single point cloud frames), data sequences (e.g., an image sequence, a video, bursts of point cloud frames, etc.), and/or any other suitable data sample. A single "log" of sensor data refers to data collected by a sensor over a contiguous time period "t". The data logs can include sensor measurement data in frames or scans over time, such as periodically, intermittently, in response to sensing events, or the like. Data logs data can be recorded constantly (e.g., continuously), periodically, randomly, upon occurrence of a trigger event (e.g., a driving event, a data value or signal exceeding a threshold value, etc.), and/or with any other suitable temporal characteristics.

In various implementations, each of the received data logs may include metadata such as, without limitation, a time stamp indicating the time of collection of the data log, location information and/or map information corresponding to the location from which the data log was collected, information relating to the environmental conditions (e.g., rainy, cloudy, sunny, etc.) at the time and location when the data log was collected, information relating to one or more events at the time and location when the data log was collected (e.g., generally a high traffic time, near-critical event, collision event, take-over event, etc.), or the like. Optionally, the system may receive metadata about the data logs from other data stores (e.g., weather database, traffic database, satellite image database, or the like).

The system may detect and label one or more objects and/or events in each received raw data log (e.g., point cloud, camera image, etc.). For example, an example object detection model (e.g., a convolutional neural network (CNN), a mask R-CNN, etc.) may be used to detect and label one or more objects and/or events in each received raw data log. The object detection model may output an image or point cloud that includes bounding boxes surrounding the detected objects and/or labels for the objects.

A "bounding box" refers to a rectangular box that represents the location of an object. A bounding box may be represented in data by x- and y-axis coordinates $[x_{max}, y_{max}]$ that correspond to a first corner of the box (such as the upper right corner), along with x- and y-axis coordinates $[x_{min}, y_{min}]$ that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera, or points of a point cloud captured by a LiDAR sensor.

A bounding box indicates a region of the unlabeled data log that is believed to contain an identified object. Thus, the bounding box may be assigned a label indicating the identified object that is believed to be contained within the bounding box. Each detected object may be represented by its location (centroid or center point), boundary, label class, or even size. In an embodiment, the object detector can output an image or point cloud that includes bounding boxes surrounding the detected objects and/or labels for the detected objects. In various embodiments, the label may correspond to the type associated with the object.

For example, based on the size and/or shape of a bounding box that is generated, it may be labeled as a bus, and be assigned an object type of "bus." It is understood that additional and/or alternate considerations and/or object types may be used within the scope of this disclosure.

The current state of a lead object may indicate a distance between the lead object and the autonomous vehicle, a current speed of the lead object, a current acceleration of the lead object and/or the like. This information may be obtained during tracking and/or motion planning. For example, point cloud data corresponding to a lead object may be used as input into a trained model (e.g., a neural network) to generate estimations relating to the state of the lead object.

The future state of the lead object may be indicative of how an autonomous vehicle expects the lead object to travel in time. For example, a state of a lead object may be used to predict the object's trajectory using any or hereafter known trajectory forecasting methods or models. The prediction system may fuse the output of a tracking system with a map of the road network and/or other observed scene context. A trajectory of a lead object that a vehicle's perception or prediction systems may generate refers to the predicted path that the lead object will follow over a time horizon, along with the predicted speed of the lead object and/or position of the lead object along the path at various points along the time horizon.

In various embodiments, the indication of the level of certainty that action should be taken on a lead object may be a value of a scale of possible values. For example, the scale may be a continuous scale from 0 to 1, where a certainty of 0 indicates minimal certainty that action should be taken with respect to a lead object, and 1 indicates maximum certainty that action should be taken with respect to a lead object. It is understood that alternative indications or measures of certainty may be used within the scope of this disclosure.

An indication of certainty for a lead object may be obtained from one or more detection operations, and may represent a certainty or uncertainty in the type of object being observed. As another example, an indication of certainty for a lead object may be obtained from one or more tracking or motion planning operations, and may represent a certainty or uncertainty in the size, velocity, and/or orientation of the object. As another example, an indication of certainty for a lead object may be obtained from one or more prediction operations, and may represent a certainty or uncertainty of the future positon of the object.

Referring back to FIG. 1, the on-board computing device may determine 102, for each of the identified lead objects, whether direct or indirect action should be taken with respect to the lead object. Direct action refers to an action proactively taken by an autonomous vehicle to remain a certain distance from the lead object such as, for example, applying the brakes, decelerating, and/or the like. Indirect action refers to an action taken by an autonomous vehicle, such as, for example, slowing or limiting acceleration towards a lead object, without directly considering the distance that the autonomous vehicle will remain from the lead object.

In various embodiments, the determination of whether direct or indirect action should be taken with respect to a lead object may be based on the safety and/or the comfort involved. For example, to ensure safety of an autonomous vehicle and its passengers, an autonomous vehicle may take direct action on a lead object when necessary to avoid a collision, regardless of the certainty level associated with the lead object. If an autonomous vehicle determines that it is not safety critical to take direct action on a lead object, then the autonomous vehicle may determine whether it should take direct or indirect action with respect to the lead object from a comfort perspective.

In considering the safety aspect of taking action on a lead object, an on-board computing device may identify a stopping authority associated with the autonomous vehicle. A stopping authority refers to a maximum rate of deceleration and/or a maximum rate-of-change of acceleration that the autonomous vehicle can safely perform. In various embodiments, this information may be stored by one or more data stores (on-board of the autonomous vehicle or externally to the autonomous vehicle), and may be retrieved by an on-board computing device.

The on-board computing device may determine whether, if the autonomous vehicle exercises the stopping authority, it could avoid intersecting with the lead object with some safety margin. The safety margin may be stored by one or more data stores (on-board of the autonomous vehicle or externally to the autonomous vehicle). The safety margin may be retrieved by an on-board computing device.

As an example, an autonomous vehicle may use its stopping authority to propagate its state to a complete stop. For every propagated state, the autonomous vehicle may check its distance from the predicted position of the lead object at that time. If the propagated state of the autonomous vehicle infringes on the safety margin (i.e., if the distance between the propagated state of the autonomous vehicle and the predicted position of the lead object is less than the safety margin), the autonomous vehicle may determine that it should take direct action to ensure safety. However, if no such infringement is detected, then the autonomous vehicle may not take direct action on the lead object to satisfy safety considerations. Rather, in this situation, there may be flexibility in how the autonomous vehicle takes action on the lead object, as discussed in more detail below.

Figure 2:
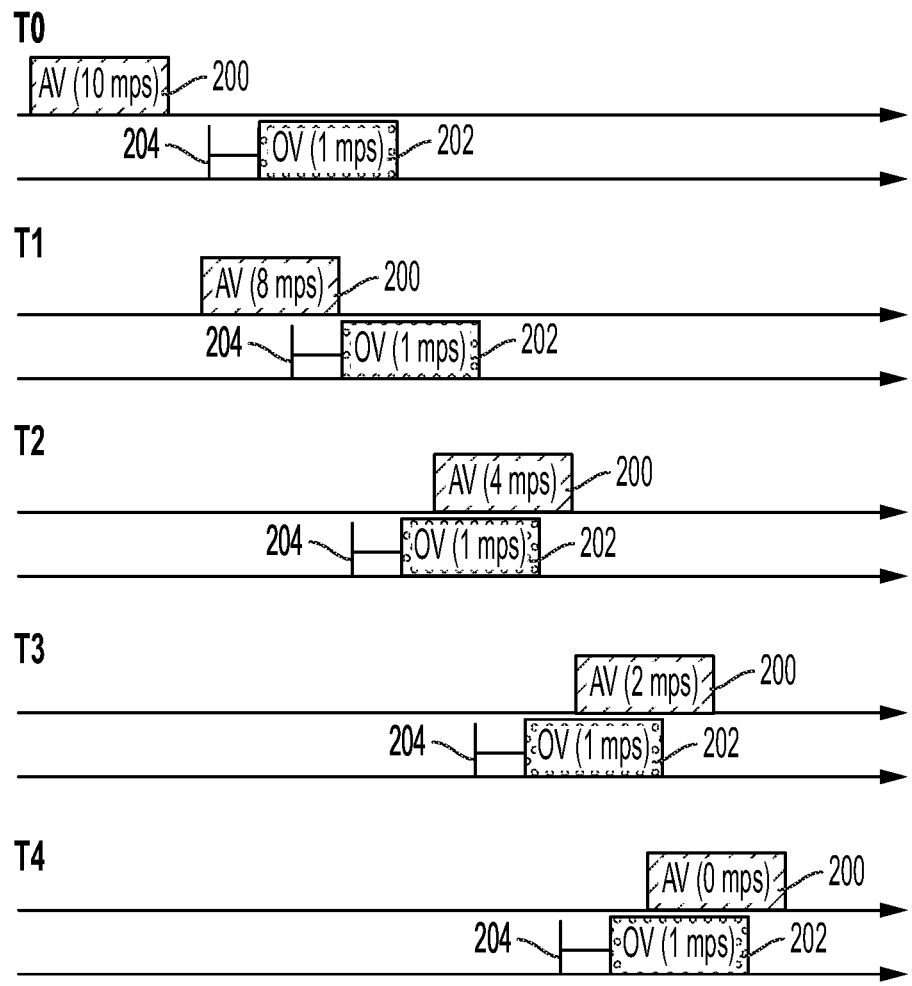
FIG. 2 illustrates a depiction of an example autonomous vehicle exercising stopping authority relative to an example lead object.

FIG. 2 illustrates a depiction of an example autonomous vehicle 200 exercising stopping authority relative to an example lead object 202. Specifically, FIG. 2 illustrates an example state of an autonomous vehicle 200 relative to a lead object 202 at time T0, and four propagated states of the autonomous vehicle relative to the predicted position of the lead object at times T1, T2, T3 and T4. FIG. 2 illustrates example velocities of the autonomous vehicle 200 at each time (as a result of exercising its stopping authority). FIG. 2 also illustrates an example velocity of the lead object 202. The safety margin is depicted by reference number 204. As illustrated in FIG. 2, the propagated state of the autonomous vehicle 200 at T1 infringes the safety margin 204, and at T2 the propagated state of the autonomous vehicle overshoots the predicted position of the lead object 202, indicating that a collision between the autonomous vehicle and the lead object would occur if the autonomous vehicle exercised its stopping authority. As such, the autonomous vehicle 200 may determine that it should take direct action on the lead object 202.

If an autonomous vehicle does not take action on a lead object for safety considerations, it may determine whether to take direct or indirect action on the lead object for comfort considerations. In general, an autonomous vehicle that is uncertain as to the need to take action on a lead object may delay such decision until it can gain more confidence in how to act. Typically, as an autonomous vehicle approaches a lead object, it better understands whether action should be taken or not. As an autonomous vehicle approaches an uncertain lead object, one of three things may happen. First, the autonomous vehicle becomes confident that the lead object requires no action. In this case, the lead object may be removed from consideration.

Second, the autonomous vehicle may become increasingly confident that action is required for the lead object. For example, an autonomous vehicle may obtain more data (e.g., data obtained from one or more sensors of the autonomous vehicle) that the lead object is a true actor or object, as opposed to a false positive. As another example, an autonomous vehicle's prediction system may obtain sufficient observations to be confident that the autonomous vehicle will interact with the lead object in the future.

Third, the autonomous vehicle may continue to be uncertain as to whether to take action on the lead object.

For the second and third scenarios, the autonomous vehicle may decide whether to take direct or indirect action. In making this determination, the autonomous vehicle may consider the certainty level associated with the lead object. An autonomous vehicle may take direct action on lead objects having certainty level that exceeds a certain value or that is within a certain range of values. For example, an autonomous vehicle may direct action on lead objects having a certainty level that is close to a value of '1' (on a scale of 0 to 1). Conversely, an autonomous vehicle may decide to defer action on a lead object if the certainty level of a lead object is below a certain value or is within a certain range of values. For example, an autonomous vehicle may defer action on a lead object having a certainty level that is close to a value of '0' (on a scale of 0 to 1). Additional and/or alternate certainty levels and/or scales may be used within the scope of this disclosure.

In determining whether to take direct or indirect action, an autonomous vehicle may consider the severity of the action that is required to take action on the lead object. In other words, how aggressively would the autonomous vehicle need to brake to avoid an interaction with the lead object. If the autonomous vehicle is far away from a slower moving lead object, the required severity of action to slow for the lead object may be small. As such, the autonomous vehicle may wait to take direct action without negatively affecting passenger comfort.

Conversely, if an autonomous vehicle is near a slower moving lead object, then the severity of action to slow for the lead object may be large. In this case, putting off action may require a more severe future action.

Table 1 below illustrates example combinations of certainty levels and severities of action along with corresponding example actions for an autonomous vehicle to take with respect to a lead object.

TABLE 1

| Certainty/Severity of Action | Low Severity of Action | High Severity of Action |
| --- | --- | --- |
| Low Certainty | Definitely delay action | Potentially take action |
| High Certainty | Potentially take action | Definitely take action |

As illustrated in Table 1, if an autonomous vehicle determines that there is low certainty associated with a lead object and that there is low severity of action required to take action on the lead object, the autonomous vehicle may delay action. Conversely, if the autonomous vehicle determines that there is high certainty associated with the lead object and that there is high severity of action required to take action on the lead object, the autonomous vehicle may take action. It is understood that additional and/or alternate combinations of certainty, severity of action, and autonomous vehicle action may be used within the scope of this disclosure.

To determine what action an autonomous vehicle should take with respect to a lead action, the autonomous vehicle may consider the certainty level of the lead object and the severity of action involved. The maximum severity of action may be defined as a function of the certainty level, and the autonomous vehicle may evaluate whether an interaction with the lead object can be avoided given the determined severity of action.

To define the maximum severity of action as a function of certainty level of the lead object, the severity of action may be parameterized by deceleration and jerk. Large values for both parameters may indicate a more severe response. These values may be specified for highly certain and highly uncertain lead objects. Different configurations may be used for different configurations for different lead object types. The values of deceleration and/or jerk may be interpolated for a given lead object based on its certainty level and its lead object type.

Table 2 illustrates example deceleration and jerk parameter values associated with example lead object types and certainty levels.

TABLE 2

| | Certainty level = 0 | | Certainty level = 1 | |
| --- | --- | --- | --- | --- |
| Lead object type | Deceleration (m/s$^2$) | Jerk (m/s$^3$) | Deceleration (m/s$^2$) | Jerk (m/s$^3$) |
| Car | 4.0 | 4.0 | 2.0 | 2.0 |
| Pedestrian | 3.0 | 3.0 | 1.0 | 1.0 |

As illustrated by Table 2, a lead object having a "pedestrian" object type and a certainty level of '0 (meaning that the system is unsure if the lead object is a pedestrian), requires a more severe action (e.g., deceleration of 3 m/s$^2$ and jerk of 3 m/s$^3$) than a pedestrian-type lead object associated with a certainty level of '1'. This severe action in effect delays action by the autonomous vehicle on this lead object.

An autonomous vehicle may evaluate whether an interaction with a lead object can be avoided based on the determined parameter values. This evaluation may involve using the applicable deceleration and jerk parameters to propagate its state to a complete stop. For every propagated state, the autonomous vehicle may check its distance from the predicted position of the lead object at that time. If the propagated state of the autonomous vehicle infringes on the safety margin (i.e., if the distance between the propagated state of the autonomous vehicle and the predicted position of the lead object is less than the safety margin), the autonomous vehicle may determine that it should take direct action. If no such infringement is detected, then the autonomous vehicle may take indirect action.

Figure 3:
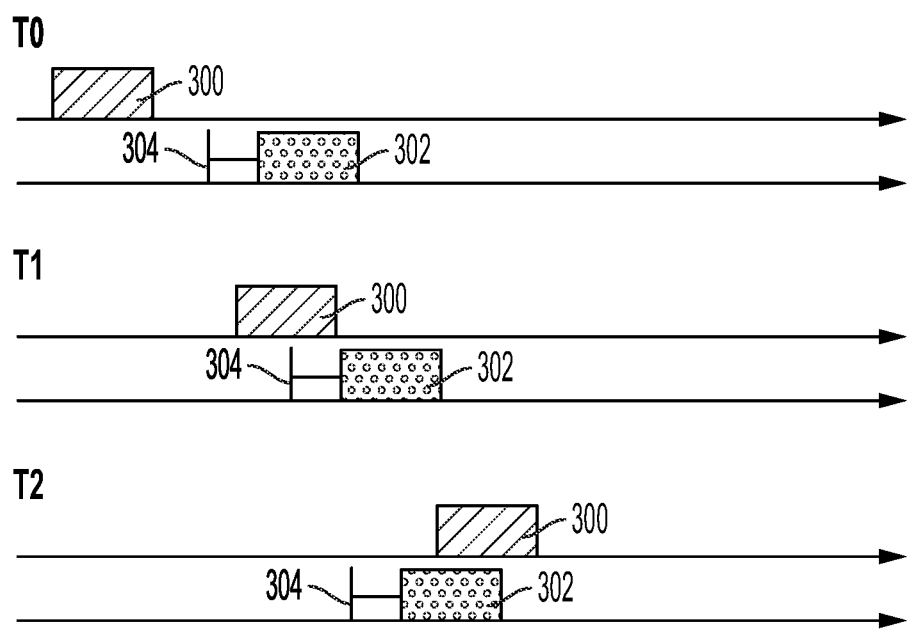
FIG. 3 illustrates a depiction of example propagated states of an autonomous vehicle relative to a lead object.

FIG. 3 illustrates a depiction of example propagated states of an autonomous vehicle 300 that is decelerating at a rate of 2 m/s$^2$ with a jerk rate of 2 m/s$^3$ relative to a lead object 302 having a "car" object type and a certainty level of '1'. As illustrated in FIG. 3, the propagated states of the autonomous vehicle 300 at time T1 infringes the safety margin 304, and the propagated state of the autonomous vehicle at time T2 overshoots the predicted position of the lead object 302, indicating that a collision between the autonomous vehicle and the lead object would occur. As such, the autonomous vehicle 300 may determine that it should take direct action on the lead object 302.

Figure 4:
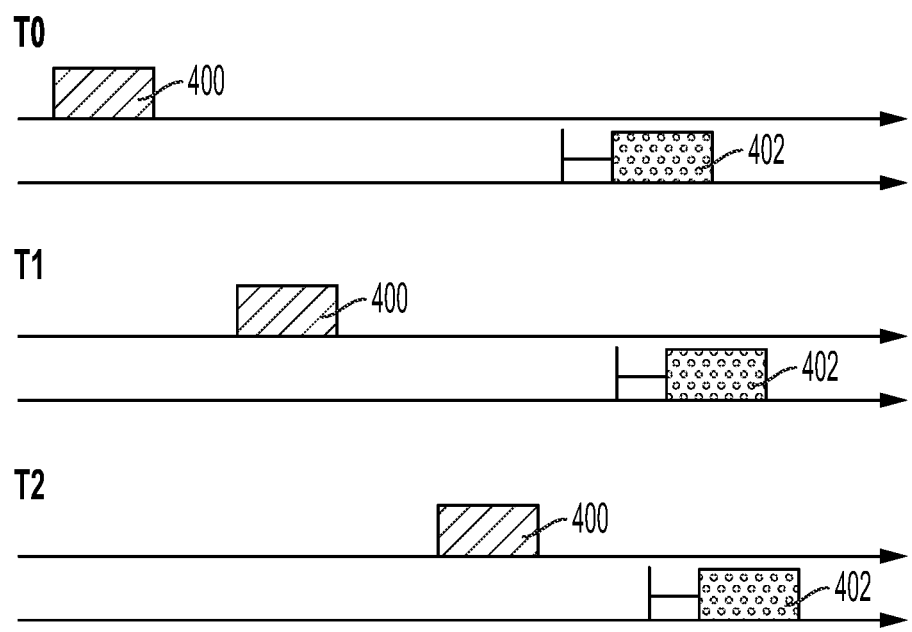
FIG. 4 illustrates a depiction of example propagated states of an autonomous vehicle relative to a lead object.

FIG. 4 illustrates a depiction of example propagated states of an autonomous vehicle 400 relative to a lead object 402 such that the final position of the autonomous vehicle at time T2 does not result in an interaction with the lead object. In this situation, the autonomous vehicle may take indirect action on the lead object.

Referring back to FIG. 1, an autonomous vehicle may assign 104 an action type to each of the lead objects that is considered by the system. The action type may correspond to the action that the autonomous vehicle determined to take with respect to the relevant lead object. For instance, if an autonomous vehicle determined to take direct action on a lead object, the autonomous vehicle may assign 104 the lead object an action type associated with direct action. Conversely, if the autonomous vehicle determined to take indirect action on a lead object, the autonomous vehicle may assign 104 the lead object an action type associated with indirect action.

For one or more of the lead objects associated with a direct action type, the autonomous vehicle may generate 106 one or more constraints for the lead object. The constraints may pertain to the position, location, and/or movement of the lead object. For example, the constraints may include the position, the velocity, and/or the acceleration of the lead object. These constraints may be taken into consideration by the autonomous vehicle as it generates a longitudinal plan (e.g., speed profile) to use to safely and comfortably follow the lead object.

In various embodiments, for one or more of the lead objects associated with an indirect action type, the autonomous vehicle may generate 108 one or more processing operations for the lead object. The processing operations may include, without limitation, one or more rules, heuristics, logic, and/or the like.

Unlike a lead object associated with a direct action type, a lead object associated with an indirect action type is not directly considered during longitudinal planning of an autonomous vehicle. Instead, the longitudinal plan is affected by such a lead object in an indirect and heuristic way. This allows an autonomous vehicle to exercise a varying degree of caution as a function of the autonomous vehicle state, the lead object state and the uncertainty level of the lead object. This level of caution may be a smooth function of certainty in the lead object and the autonomous vehicle states.

Figure 5:
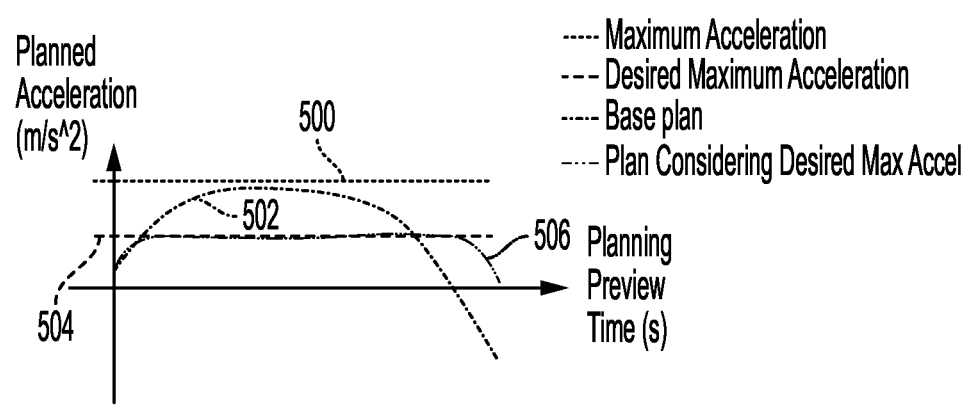
FIG. 5 illustrates a graph of example acceleration over time for an example autonomous vehicle.

One mechanism to indirectly affect a speed plan for an autonomous vehicle on a lead object having an action type of indirect action is to limit positive acceleration of the autonomous vehicle. For example, FIG. 5 illustrates a graph of example acceleration over time for an example autonomous vehicle. As illustrated by FIG. 5, considering only the maximum acceleration 500 of the autonomous vehicle, the base plan 502 may be generated. However, it may be uncomfortable and potentially unsafe to proceed with such acceleration if there are one or more uncertain lead objects located ahead of the autonomous vehicle. As such, a desired maximum acceleration 504 may be imposed to generate a more conservative speed profile 506.

The desired maximum acceleration may be a function of the autonomous vehicle state and the state of the lead object. For example, an autonomous vehicle may determine the desired maximum acceleration based on the time needed for the autonomous vehicle to travel to the lead object's current position. The autonomous vehicle may determine the time to the current lead object position in light of the autonomous vehicle's current speed and acceleration. If this time exceeds a threshold value (e.g., it will take an autonomous vehicle some time to reach the lead object), an on-board computing device of the autonomous vehicle may set its acceleration to a value such that the autonomous vehicle's behavior is minimally affected, and will cause the autonomous vehicle to accelerate to the set value. For example, an on-board computing device may set the acceleration to a high value, and may cause the autonomous vehicle to achieve this acceleration by applying the gas.

If the determined time is below a threshold value (e.g., the autonomous vehicle would reach the lead object relatively quickly), an on-board computing device of the autonomous vehicle may set its acceleration to zero or a relative low value to prevent the autonomous vehicle from accelerating assertively.

In certain embodiments, if the determined time is below a threshold value (such as, for example, a calibrable threshold), an on-board computing device of the autonomous vehicle may set its acceleration to a small negative value to cause the autonomous vehicle to begin slowing down.

Referring back to FIG. 1, an autonomous vehicle may generate 106 a constraint set by combining the constraints associated with the lead objects having a direct-action action type. If multiple lead objects are considered for direct action, there may be multiple constraints to consider. This information may be aggregated in order to provide to a longitudinal planner to generate a longitudinal plan for the autonomous vehicle. In various embodiments, an autonomous vehicle may only provide the longitudinal planner with the most restrictive constraint of the set.

An autonomous vehicle may generate 108 a processing operation set by combining the processing operations associated with the lead objects having an indirect-action action type. If multiple lead objects are considered for indirect action, then there may be multiple processing operations (e.g., multiple desired maximum accelerations) to consider. This information may be aggregated in order to provide to a longitudinal planner to generate a longitudinal plan for the autonomous vehicle. In various embodiments, an autonomous vehicle may only provide the longitudinal planner with the most restrictive processing operation from the set (e.g., the minimum desired maximum acceleration from the set).

The autonomous vehicle may generate 110 a longitudinal plan for the autonomous vehicle based, at least in part, on the constraint set and the processing operation set. In various embodiments, a longitudinal planner of the on-board computing device may generate 110 a longitudinal plan for the autonomous vehicle. For instance, an on-board computing device may generate 110 a longitudinal plan for the autonomous vehicle that adheres to the constraints in the constraint set and the processing operations of the processing operation set. Alternatively, an on-board computing device may generate 110 a longitudinal plan for the autonomous vehicle that adheres to only the most restrictive constraint of the constraint set and the most restrictive processing operation of the processing operation set.

The on-board computing device may cause 112 the autonomous vehicle to adjust its operation by executing the longitudinal plan. For instance, if the longitudinal plan instructs the autonomous vehicle to decelerate in response to it approaching a certain lead object, the on-board computing device may cause the autonomous vehicle to not accelerate or to apply the brakes. As another example, if the longitudinal plan instructs the autonomous vehicle to accelerate, the on-board computing device may cause the autonomous vehicle to apply the gas to achieve the instructed rate of acceleration.

Figure 6:
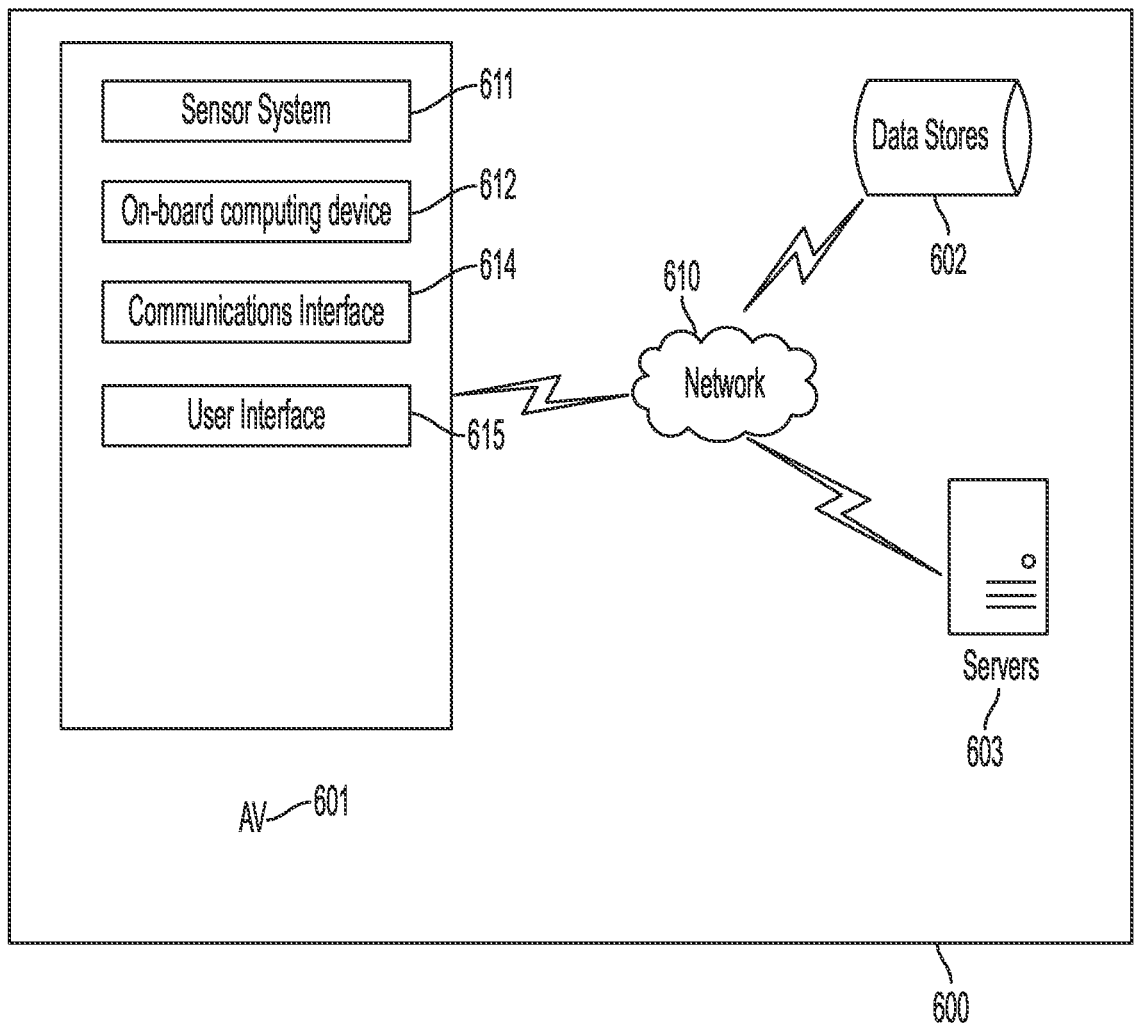
FIG. 6 is a block diagram illustrating an example autonomous vehicle system.

FIG. 6 is a block diagram illustrating an example system 600 that includes an autonomous vehicle 601 in communication with one or more data stores 602 and/or one or more servers 603 via a network 610. Although there is one autonomous vehicle shown, multiple autonomous vehicles may be coupled to each other and/or coupled to data stores 602 and/or servers 603 over network 610. Network 610 may be any type of network such as a local area network (LAN), a wide area network (WAN) such as the Internet, a cellular network, a satellite network, or a combination thereof, and may be wired or wireless. Data store(s) 602 may be any kind of data stores such as, without limitation, map data store(s), traffic information data store(s), user information data store(s), point of interest data store(s), or any other type of content data store(s). Server(s) 603 may be any kind of servers or a cluster of servers, such as, without limitation, Web or cloud servers, application servers, backend servers, or a combination thereof.

As illustrated in FIG. 6, the autonomous vehicle 601 may include a sensor system 611, an on-board computing device 612, a communications interface 614, and a user interface 615. Autonomous vehicle 601 may further include certain components (as illustrated, for example, in FIG. 7) included in vehicles, such as, an engine, wheels, steering wheel, transmission, etc., which may be controlled by the on-board computing device 612 using a variety of communication signals and/or commands, such as, for example, acceleration signals or commands, deceleration signals or commands, steering signals or commands, braking signals or commands, etc.

The sensor system 611 may include one or more sensors that are coupled to and/or are included within the autonomous vehicle 601. Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 601, information about the environment itself, information about the motion of the autonomous vehicle 601, information about a route of the autonomous vehicle, or the like. As autonomous vehicle 601 travels over a surface, at least some of the sensors may collect data pertaining to the surface.

The LiDAR system may include a sensor configured to sense or detect objects and/or actors in an environment in which the autonomous vehicle 601 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 360° horizon of the first vehicle. The LiDAR system may be configured to provide to the computing device a cloud of point data representing the surface(s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LiDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, the LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 601 such as, without limitation, other vehicles (autonomous or driven), robots, satellites, etc.

Figure 7:
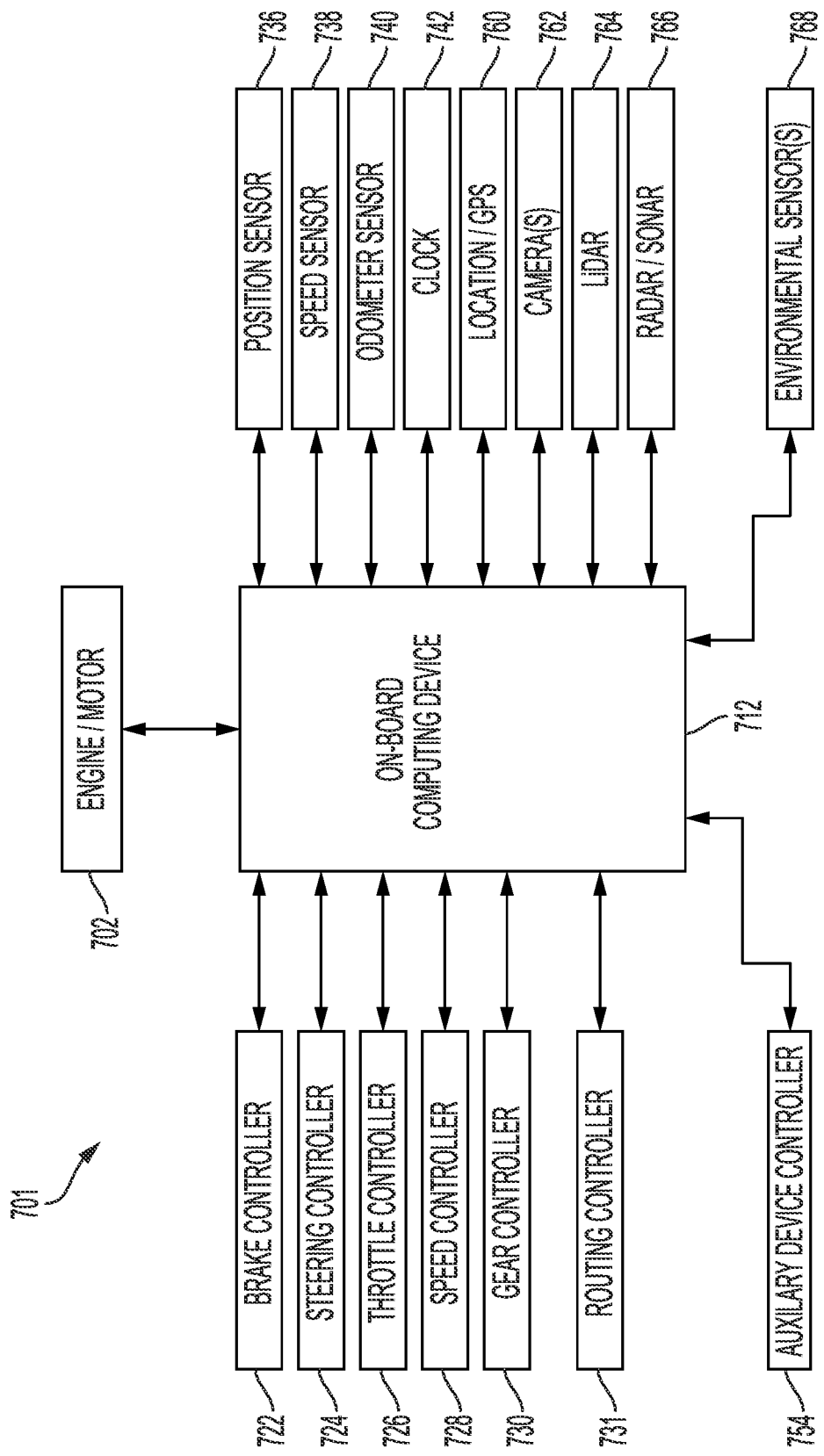
FIG. 7 illustrates an example vehicle controller system.

FIG. 7 illustrates an example system architecture for a vehicle 701, such as the autonomous vehicle 601 of FIG. 6. The vehicle 701 may include an engine or motor 702 and various sensors for measuring various parameters of the vehicle and/or its environment. Operational parameter sensors that are common to both types of vehicles include, for example: a position sensor 736 such as an accelerometer, gyroscope and/or inertial measurement unit; a speed sensor 738; and an odometer sensor 740. The vehicle 701 also may have a clock 742 that the system architecture uses to determine vehicle time during operation. The clock 742 may be encoded into the vehicle on-board computing device 712, it may be a separate device, or multiple clocks may be available.

The vehicle 701 also may include various sensors that operate to gather information about the environment in which the vehicle is traveling. These sensors may include, for example: a location sensor 760 such as a GPS device; object detection sensors such as one or more cameras 762; a LiDAR sensor system 764; and/or a radar and or and/or a sonar system 766. The sensors also may include environmental sensors 768 such as a precipitation sensor and/or ambient temperature sensor. The object detection sensors may enable the vehicle 701 to detect objects that are within a given distance or range of the vehicle 701 in any direction, while the environmental sensors collect data about environmental conditions within the vehicle's area of travel. The system architecture will also include one or more cameras 762 for capturing images of the environment.

During operations, information is communicated from the sensors to an on-board computing device 712. The on-board computing device 712 analyzes the data captured by the sensors and optionally controls operations of the vehicle based on results of the analysis. For example, the on-board computing device 712 may control braking via a brake controller 722; direction via a steering controller 724; speed and acceleration via a throttle controller 726 (in a gas-powered vehicle) or a motor speed controller 728 (such as a current level controller in an electric vehicle); a differential gear controller 730 (in vehicles with transmissions); and/or other controllers such as an auxiliary device controller 754.

Geographic location information may be communicated from the location sensor 760 to the on-board computing device 712, which may then access a map of the environment that corresponds to the location information to determine known fixed features of the environment such as streets, buildings, stop signs and/or stop/go signals. Captured images from the cameras 762 and/or object detection information captured from sensors such as a LiDAR system 764 is communicated from those sensors to the on-board computing device 712. The object detection information and/or captured images may be processed by the on-board computing device 712 to detect objects in proximity to the vehicle 701. In addition or alternatively, the vehicle 701 may transmit any of the data to a remote server system 603 (FIG. 6) for processing. Any known or to be known technique for making an object detection based on sensor data and/or captured images can be used in the embodiments disclosed in this document.

The on-board computing device 712 may obtain, retrieve, and/or create map data that provides detailed information about the surrounding environment of the autonomous vehicle 701. The on-board computing device 712 may also determine the location, orientation, pose, etc. of the AV in the environment (localization) based on, for example, three dimensional position data (e.g., data from a GPS), three dimensional orientation data, predicted locations, or the like. For example, the on-board computing device 712 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 712 in analyzing the surrounding environment of the autonomous vehicle 701.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 712 may also include and/or may receive information relating to the trip or route of a user, real-time traffic information on the route, or the like.

The on-board computing device 712 may include and/or may be in communication with a routing controller 731 that generates a navigation route from a start position to a destination position for an autonomous vehicle. The routing controller 731 may access a map data store to identify possible routes and road segments that a vehicle can travel on to get from the start position to the destination position. The routing controller 731 may score the possible routes and identify a preferred route to reach the destination. For example, the routing controller 731 may generate a navigation route that minimizes Euclidean distance traveled or other cost function during the route, and may further access the traffic information and/or estimates that can affect an amount of time it will take to travel on a particular route. Depending on implementation, the routing controller 731 may generate one or more routes using various routing methods, such as Dijkstra's algorithm, Bellman-Ford algorithm, or other algorithms. The routing controller 731 may also use the traffic information to generate a navigation route that reflects expected conditions of the route (e.g., current day of the week or current time of day, etc.), such that a route generated for travel during rush-hour may differ from a route generated for travel late at night. The routing controller 731 may also generate more than one navigation route to a destination and send more than one of these navigation routes to a user for selection by the user from among various possible routes.

In various embodiments, an on-board computing device 712 may determine perception information of the surrounding environment of the autonomous vehicle 701. Based on the sensor data provided by one or more sensors and location information that is obtained, the on-board computing device 712 may determine perception information of the surrounding environment of the autonomous vehicle 701. The perception information may represent what an ordinary driver would perceive in the surrounding environment of a vehicle. The perception data may include information relating to one or more objects in the environment of the autonomous vehicle 701. For example, the on-board computing device 712 may process sensor data (e.g., LiDAR or RADAR data, camera images, etc.) in order to identify objects and/or features in the environment of autonomous vehicle 701. The objects may include traffic signals, road way boundaries, other vehicles, pedestrians, and/or obstacles, etc. The on-board computing device 712 may use any now or hereafter known object recognition algorithms, video tracking algorithms, and computer vision algorithms (e.g., track objects frame-to-frame iteratively over a number of time periods) to determine the perception.

In some embodiments, the on-board computing device 712 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 712 may perform one or more prediction and/or forecasting operations. For example, the on-board computing device 712 may predict future locations, trajectories, and/or actions of one or more objects. For example, the on-board computing device 712 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 701, the surrounding environment, and/or their relationship(s). For example, if an object is a vehicle and the current driving environment includes an intersection, the on-board computing device 712 may predict whether the object will likely move straight forward or make a turn. If the perception data indicates that the intersection has no traffic light, the on-board computing device 712 may also predict whether the vehicle may have to fully stop prior to entering the intersection.

In various embodiments, the on-board computing device 712 may determine a motion plan for the autonomous vehicle. For example, the on-board computing device 712 may determine a motion plan for the autonomous vehicle based on the perception data and/or the prediction data. Specifically, given predictions about the future locations of proximate objects and other perception data, the on-board computing device 712 can determine a motion plan for the autonomous vehicle 701 that best navigates the autonomous vehicle relative to the objects at their future locations.

In one or more embodiments, the on-board computing device 712 may receive predictions and make a decision regarding how to handle objects and/or actors in the environment of the autonomous vehicle 701. For example, for a particular actor (e.g., a vehicle with a given speed, direction, turning angle, etc.), the on-board computing device 712 decides whether to overtake, yield, stop, and/or pass based on, for example, traffic conditions, map data, state of the autonomous vehicle, etc. Furthermore, the on-board computing device 712 also plans a path for the autonomous vehicle 701 to travel on a given route, as well as driving parameters (e.g., distance, speed, and/or turning angle). That is, for a given object, the on-board computing device 712 decides what to do with the object and determines how to do it. For example, for a given object, the on-board computing device 712 may decide to pass the object and may determine whether to pass on the left side or right side of the object (including motion parameters such as speed). The on-board computing device 712 may also assess the risk of a collision between a detected object and the autonomous vehicle 701. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 712 may execute one or more control instructions to perform a cautious maneuver (e.g., mildly slow down, accelerate, change lane, or swerve). In contrast, if the collision cannot be avoided, then the on-board computing device 712 may execute one or more control instructions for execution of an emergency maneuver (e.g., brake and/or change direction of travel).

As discussed above, planning and control data regarding the movement of the autonomous vehicle is generated for execution. The on-board computing device 712 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and/or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 6, the communications interface 614 may be configured to allow communication between the autonomous vehicle 601 and external systems, such as, for example, external devices, sensors, other vehicles, servers, data stores, databases etc. Communications interface 614 may utilize any now or hereafter known protocols, protection schemes, encodings, formats, packaging, etc. such as, without limitation, Wi-Fi, an infrared link, Bluetooth, etc. User interface system 615 may be part of peripheral devices implemented within vehicle 601 including, for example, a keyword, a touch screen display device, a microphone, and a speaker, etc.

Figure 8:
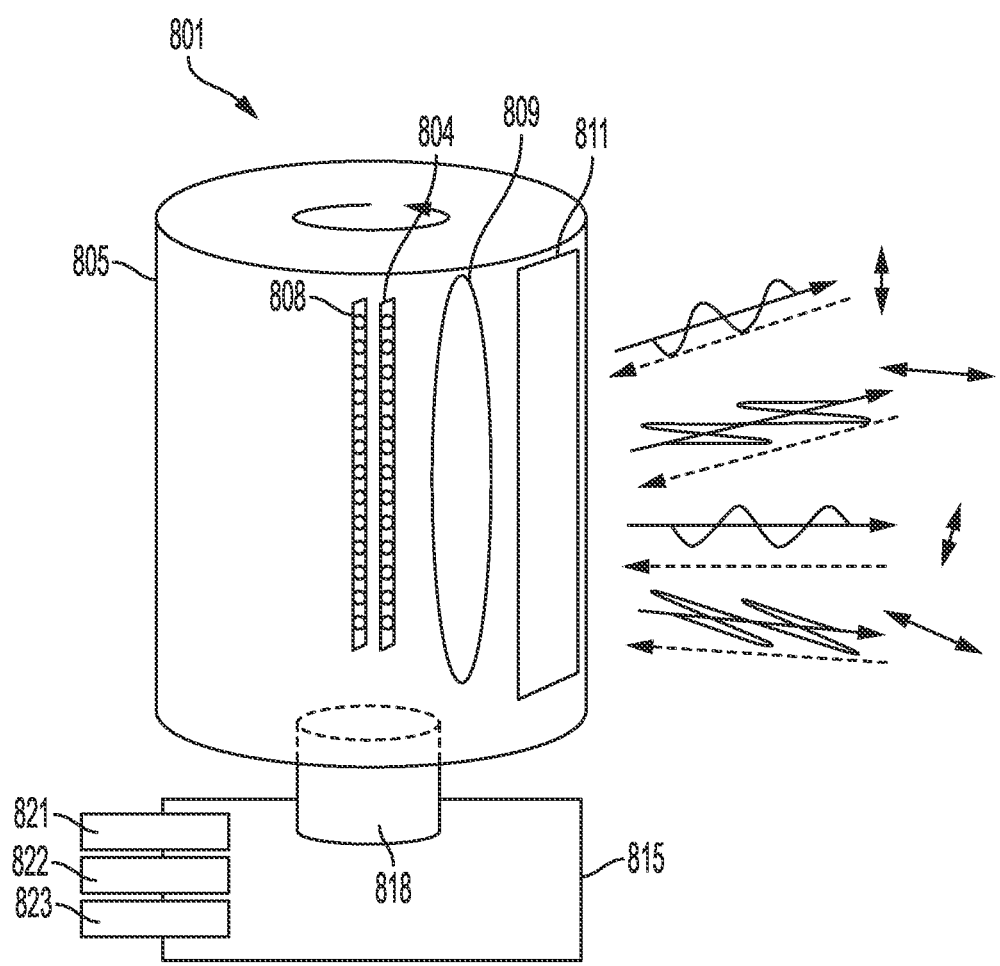
FIG. 8 shows an example LiDAR system.

FIG. 8 shows an example LiDAR system 801 as may be used in various embodiments. As shown in FIG. 8, the LiDAR system 801 includes a housing 805 which may be rotatable 360° about a central axis such as hub or axle 818. The housing may include an emitter/receiver aperture 811 made of a material transparent to light. Although the example shown in FIG. 8 has a single aperture, in various embodiments, multiple apertures for emitting and/or receiving light may be provided. Either way, the system can emit light through one or more of the aperture(s) 811 and receive reflected light back toward one or more of the aperture(s) 811 as the housing 805 rotates around the internal components. In an alternative embodiment, the outer shell of housing 805 may be a stationary dome, at least partially made of a material that is transparent to light, with rotatable components inside of the housing 805.

Inside the rotating shell or stationary dome is a light emitter system 804 that is configured and positioned to generate and emit pulses of light through the aperture 811 or through the transparent dome of the housing 805 via one or more laser emitter chips or other light emitting devices. The emitter system 804 may include any number of individual emitters, including for example 8 emitters, 64 emitters or 128 emitters. The emitters may emit light of substantially the same intensity, or of varying intensities. The individual beams emitted by 804 will have a well-defined state of polarization that is not the same across the entire array. As an example, some beams may have vertical polarization and other beams may have horizontal polarization. The LiDAR system will also include a light detector 808 containing a photodetector or array of photodetectors positioned and configured to receive light reflected back into the system. The emitter system 804 and detector 808 would rotate with the rotating shell, or they would rotate inside the stationary dome of the housing 805. One or more optical element structures 809 may be positioned in front of the light emitting unit 804 and/or the detector 808 to serve as one or more lenses or waveplates that focus and direct light that is passed through the optical element structure 809.

One or more optical element structures 809 may be positioned in front of the mirror to focus and direct light that is passed through the optical element structure 809. As shown below, the system includes an optical element structure 809 positioned in front of the mirror and connected to the rotating elements of the system so that the optical element structure 809 rotates with the mirror 802. Alternatively or in addition, the optical element structure 809 may include multiple such structures (for example lenses and/or waveplates). Optionally, multiple optical element structures 809 may be arranged in an array on or integral with the shell portion 811.

Optionally, each optical element structure 809 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 821 to power the laser emitter unit 804, a motor, and electronic components. The LiDAR system will also include an analyzer 815 with elements such as a processor 822 and non-transitory computer-readable memory 823 containing programming instructions that are configured to enable the system to receive data collected by the light detector unit, analyze it to measure characteristics of the light received, and generate information that a connected system can use to make decisions about operating in an environment from which the data was collected. Optionally, the analyzer 815 may be integral with the LiDAR system 801 as shown, or some or all of it may be external to the LiDAR system and communicatively connected to the LiDAR system via a wired or wireless communication network or link.

Figure 9:
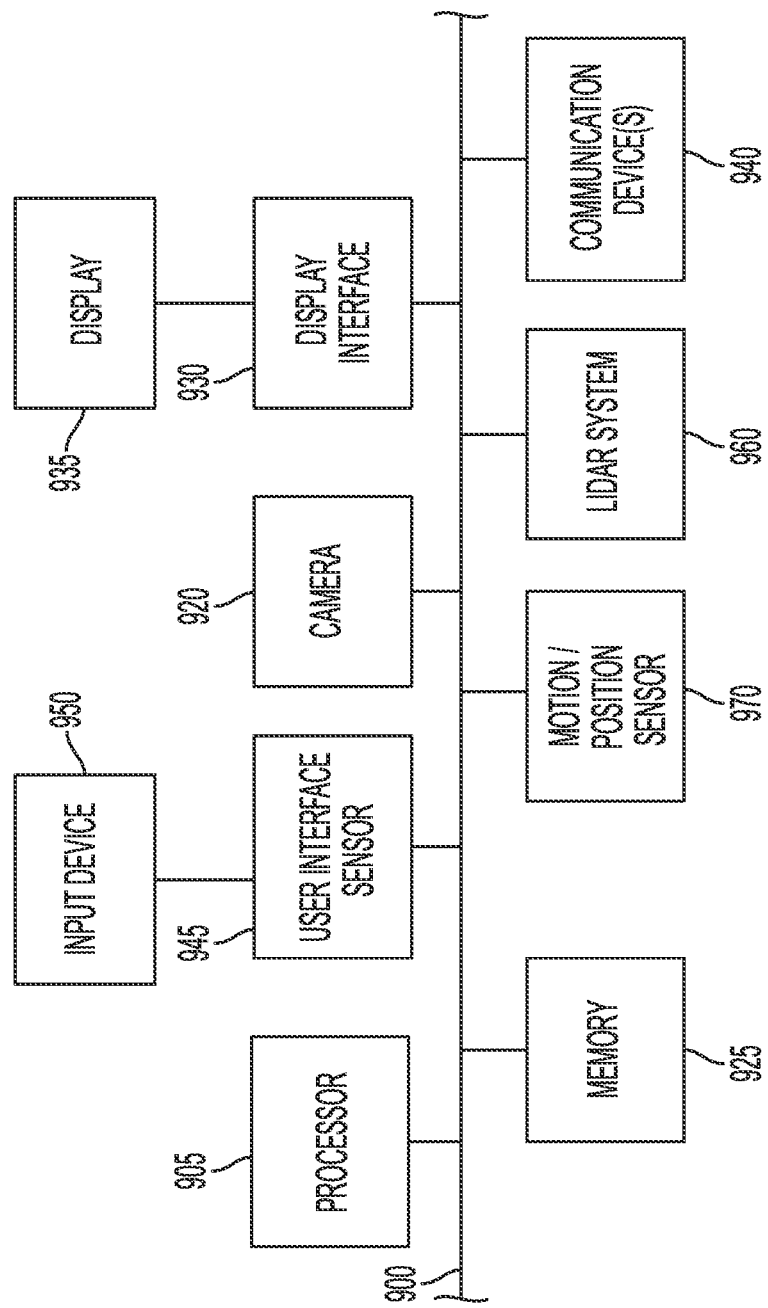
FIG. 9 is a block diagram that illustrates various elements of a possible electronic system, subsystem, controller and/or other component of an AV, and/or external electronic device.

FIG. 9 depicts an example of internal hardware that may be included in any of the electronic components of the system, such as internal processing systems of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may receive data from a LiDAR system 960 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction- related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium." "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object."

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "longitudinal plan" refers to one or more instructions for how an autonomous vehicle is to execute longitudinal control. These instructions may relate to brake and/or throttle control.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method comprising:
   by a computing device of an autonomous vehicle:
   identifying one or more lead objects located in front of the autonomous vehicle,
   for each of the one or more lead objects that are identified, determining an action type associated with the lead object, wherein the action type indicates a type of action for the autonomous vehicle to take with respect to the lead object, wherein the action type comprises a direct action type and an indirect action type,
   for each of the one or more lead objects associated with the direct action type, generating one or more constraints associated with the lead object,
   for each of the one or more lead objects associated with the indirect action type, generating one or more processing operations associated with the lead object,
   generating a constraint set comprising at least a portion of the constraints generated for each of the one or more lead objects associated with the direct action type, wherein the direct action type includes an action taken by the autonomous vehicle to remain a certain distance from the one or more lead objects,
   generating a processing operation set comprising at least a portion of the processing operations generated for each of the one or more lead objects associated with the indirect action type, wherein the indirect action type includes an action without directly considering the distance that the autonomous vehicle will remain from the one or more lead objects and
   generating a longitudinal plan for the autonomous vehicle based in part on the constraint set associated with the direct action type and the processing operation set associated with the indirect action type; and
   causing the autonomous vehicle to adjust its operation based on the longitudinal plan.

2. The method of claim 1, wherein causing the autonomous vehicle to adjust its operation based on the longitudinal plan comprises one or more of the following:
   causing the autonomous vehicle to limit its positive acceleration, or causing the autonomous vehicle to decelerate.

3. The method of claim 1, wherein determining an action type associated with the one or more lead objects comprises:
identifying a stopping authority of the autonomous vehicle; and
determining whether the autonomous vehicle would interact with the one or more lead objects if the autonomous vehicle exercised the stopping authority.

4. The method of claim 3, wherein the stopping authority comprises one or more of the following:
a maximum rate of deceleration; or
a maximum rate-of-change of acceleration.

5. The method of claim 3, wherein determining whether the autonomous vehicle would interact with the one or more lead objects if the autonomous vehicle exercised the stopping authority comprises:
identifying a safety margin associated with the one or more lead objects, wherein the safety margin represents the certain distance away from the one or more lead objects;
propagating one or more states of the autonomous vehicle over a time period to a complete stop;
for each propagated state, determining whether a distance between the autonomous vehicle in the propagated state at a time in the time period and a predicted position of the one or more lead objects at the time is less than the safety margin; and
in response to determining that the distance between the autonomous vehicle in the propagated state at the time and a predicted position of the one or more lead objects at the time is less than the safety margin, assigning the one or more lead objects the direct action type.

6. The method of claim 1, wherein determining an action type associated with the one or more lead objects comprises:
determining a certainty level associated with the lead object; determining a severity of action associated with the one or more lead objects; determining an object type associated with the one or more lead objects;
identifying a rate of deceleration and a rate of jerk associated with the certainty level, the severity of action, and the object type; and
determining whether an interaction with the one or more lead objects can be avoided if the autonomous vehicle exercises the rate of deceleration and the rate of jerk.

7. The method of claim 6, wherein determining whether an interaction with the one or more lead objects can be avoided if the autonomous vehicle exercises the rate of deceleration and the rate of jerk comprises:
identifying a safety margin associated with the one or more lead objects, wherein the safety margin represents a distance away from the one or more lead objects;
propagating one or more states of the autonomous vehicle over a time period to a complete stop; and
for each propagated state, determining whether a distance between the autonomous vehicle in the propagated state at a time in the time period and a predicted position of the one or more lead objects at the time is less than the safety margin.

8. The method of claim 7, further comprising:
in response to determining that the distance between the autonomous vehicle in the propagated state at the time and a predicted position of the one or more lead objects at the time is less than the safety margin, assigning the one or more lead objects the direct action type.

9. The method of claim 7, further comprising:
in response to determining that the distance between the autonomous vehicle in the propagated state at the time and a predicted position of the one or more lead objects at the time is not less than the safety margin, assigning the one or more lead objects the indirect action type.

10. The method of claim 1, wherein generating a constraint set comprises combining the at least a portion of the constraints generated for each of the one or more lead objects associated with the direct action type.

11. The method of claim 1, wherein generating a processing operation set comprises combining the at least a portion of the processing operations generated for each of the one or more lead objects associated with the indirect action type.

12. The method of claim 1, wherein generating a longitudinal plan for the autonomous vehicle comprises providing a most restrictive constraint from the constraint set and a most restrictive processing operation from the processing operation set to a longitudinal controller of the autonomous vehicle.

13. A system comprising:
a computing device of an autonomous vehicle; and
a computer-readable storage medium, comprising one or more programming instructions that, when executed, cause the computing device to:
identify one or more lead objects located in front of the autonomous vehicle,
for each of the one or more lead objects that are identified, determine an action type associated with the lead object, wherein the action type indicates a type of action for the autonomous vehicle to take with respect to the lead object, wherein the action type comprises a direct action type and an indirect action type,
for each of the one or more lead objects associated with the direct action type, generate one or more constraints associated with the lead object,
for each of the one or more lead objects associated with the indirect action type, generate one or more processing operations associated with the lead object,
generate a constraint set comprising at least a portion of the constraints generated for each of the one or more lead objects associated with the direct action type, wherein the direct action type includes an action taken by the autonomous vehicle to remain a certain distance from the one or more lead objects,
generate a processing operation set comprising at least a portion of the processing operations generated for each of the one or more lead objects associated with the indirect action type, wherein the indirect action type includes an action without directly considering the distance that the autonomous vehicle will remain from the one or more lead objects, and
generate a longitudinal plan for the autonomous vehicle based in part on the constraint set associated with the direct action type and the processing operation set associated with the indirect action type; and
cause the autonomous vehicle to adjust its operation based on the longitudinal plan.

14. The system of claim 13, wherein the one or more programming instructions that, when executed, cause the autonomous vehicle to adjust its operation based on the longitudinal plan comprises one or more programming instructions that, when executed, cause the autonomous vehicle to perform one or more of the following:
limit its positive acceleration, or
decelerate.

15. The system of claim 13, wherein the one or more programming instructions that, when executed, cause the computing device to determine an action type associated with the one or more lead objects comprises one or more programming instructions that, when executed, cause the computing device to:
- identify a stopping authority of the autonomous vehicle; and
- determine whether the autonomous vehicle would interact with the one or more lead objects if the autonomous vehicle exercised the stopping authority.

16. The system of claim 15, wherein the stopping authority comprises one or more of the following:
- a maximum rate of deceleration; or
- a maximum rate-of-change of acceleration.

17. The system of claim 15, wherein the one or more programming instructions that, when executed, cause the computing device to determine whether the autonomous vehicle would interact with the one or more lead objects if the autonomous vehicle exercised the stopping authority comprises one or more programming instructions that, when executed, cause the computing device to:
- identify a safety margin associated with the one or more lead objects, wherein the safety margin represents the certain distance away from the one or more lead objects;
- propagate one or more states of the autonomous vehicle over a time period to a complete stop;
- for each propagated state, determine whether a distance between the autonomous vehicle in the propagated state at a time in the time period and a predicted position of the one or more lead objects at the time is less than the safety margin; and
- in response to determining that the distance between the autonomous vehicle in the propagated state at the time and a predicted position of the one or more lead objects at the time is less than the safety margin, assign the one or more lead objects the direct action type.

18. The system of claim 13, wherein the one or more programming instructions that, when executed, cause the computing device to determine an action type associated with the one or more lead objects comprises one or more programming instructions that, when executed, cause the computing device to:
- determine a certainty level associated with the one or more lead objects;
- determine a severity of action associated with the one or more lead objects; determine an object type associated with the one or more lead objects;
- identify a rate of deceleration and a rate of jerk associated with the certainty level, the severity of action, and the object type; and
- determine whether an interaction with the one or more lead objects can be avoided if the autonomous vehicle exercises the rate of deceleration and the rate of jerk.

19. The system of claim 18, wherein the one or more programming instructions that, when executed, cause the computing device to determine whether an interaction with the one or more lead objects can be avoided if the autonomous vehicle exercises the rate of deceleration and the rate of jerk comprises one or more programming instructions that, when executed, cause the computing device to:
- identify a safety margin associated with the one or more lead objects, wherein the safety margin represents a distance away from the one or more lead objects;
- propagate one or more states of the autonomous vehicle over a time period to a complete stop; and
- for each propagated state, determine whether a distance between the autonomous vehicle in the propagated state at a time in the time period and a predicted position of the one or more lead objects at the time is less than the safety margin.

20. The system of claim 19, wherein the computer-readable storage medium further comprises one or more programming instructions that, when executed, cause the computing device to:
- in response to determining that the distance between the autonomous vehicle in the propagated state at the time and a predicted position of the one or more lead objects at the time is less than the safety margin, assign the one or more lead objects the direct action type; and
- in response to determining that the distance between the autonomous vehicle in the propagated state at the time and a predicted position of the one or more lead objects at the time is not less than the safety margin, assign the one or more lead objects the indirect action type.

21. The system of claim 13, wherein the one or more programming instructions that, when executed, cause the computing device to generate a constraint set comprises one or more programming instructions that, when executed, cause the computing device to combine the at least a portion of the constraints generated for each of the one or more lead objects associated with the direct action type.

22. The system of claim 13, wherein the one or more programming instructions that, when executed, cause the computing device to generate a processing operation set comprises one or more programming instructions that, when executed, cause the computing device to combine the at least a poltion of the processing operations generated for each of the one or more lead objects associated with the indirect action type.

23. The system of claim 13, wherein the one or more programming instructions that, when executed, cause the computing device to generate a longitudinal plan for the autonomous vehicle comprises one or more programming instructions that, when executed, cause the computing device to provide a most restrictive constraint from the constraint set and a most restrictive processing operation from the processing operation set to a longitudinal controller of the autonomous vehicle.

* * * * *